United States Patent Office 2,824,856
Patented Feb. 25, 1958

2,824,856
RESINOUS ADHESIVE MATERIALS

James H. Saunders, Anniston, Ala., assignor to Monsanto Chemical Company, St. Louis, Mo., a corporation of Delaware No Drawing. Application June 29, 1953
Serial No. 364,930

5 Claims. (Cl. 260—77.5)

This invention relates to new, resinous materials, and particularly to suitable resins for use as adhesives.

According to the present invention, new, resinous materials are prepared by condensing a compound having the structure:

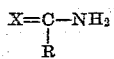

where X is O, S or NH and R is selected from the group consisting of $NH_2$ and:

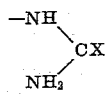

with a glycol and a triamine, the proportions of the three ingredients being as described hereinafter.

Compounds having the structure:

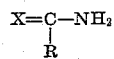

and useful in the present invention are: urea, thiourea, guanidine, biruet and thiobiruet.

The glycol component employed in the present condensation may be any glycol, such, for example, as ethylene glycol, propylene glycol, butylene glycol, 2-methylbutane diol-2,4,2-ethylhexane diol-1,3, hexamethylene glycol, styrene glycol, N-phenyl diethanolamine, catechol, resorcinol, 2,2-bis(4-hydroxy phenyl) propane, p,p'-dihydroxy biphenyl, decamethylene glycol, polyglycol (ethyl glycols) such as polyethylene glycols, diethylene glycol, triethylene glycol, tetraethylene glycol, polyethylene glycols having molecular weights of 200, 400 and 600 or intermediate values thereof, polypropylene glycols, polypropylene gylcols having molecular weights of the order of 400, 750, 1200 and 2000, monoethers of trihydroxy compounds such as glycerine, alpha-allyl ether, glycerol alpha-phenyl ether, glycerol alpha-isopropyl ether, hydroxy esters such as an ester prepared from one mole of dibasic acid and two moles of a glycol or polyglycol, a polyester prepared so that the molar ratio of glycol or polyglycol to the dibasic acid is between 2 and 1, an ester prepared from one mole of the dimer acid and 2 moles of a glycol or polyglycol, an ester prepared from a hydroxy acid and a glycol or polyglycol so that the molar ratio of the glycol or polyglycol to the hydroxy acid is between 0.5 and 1 and an ester prepared from one mole of a trihydroxy compound and one mole of a monobasic acid such as the monoglyceride of eleostearic acid.

The triamine component employed in the preparation of of the present resinous bodies may be any aliphatic or aromatic triamine. In the case of aromatic triamines the amino groups are preferably attached to the different aromatic nuclei. In the case of aliphatic triamines for best results the amino groups should be separated by at least 3 atoms.

Suitable triamines are: 4,4',4''-triaminotriphenylmethane, 2,4',4''-triaminotriphenylmethane, 2,4-bis-aminobenzylaniline, triaminotritolylmethane, 2,4,4'-triaminobiphenyl, 1,4,5-triaminonaphthalene, 1,3,8-triaminonaphthalene, 1,3,5-triaminobenzene, 1,3,5-triaminotoluene, 4,4',4''-triamino-m-terphenyl, triaminanthracene, triaminophenanthrene.

For the successful preparation of resinous materials suitable for use as adhesives, it is necessary in proportioning the ingredients to be reacted together that consideration be given to two ratios, the values of which should be maintained within the limits here given:

(1)

$$\frac{\text{Moles of } X=C-NH_2 \text{ (with } R)}{\text{Active hydrogen groups}} =$$

at least 0.25 but not in excess of 1.5

(2)

$$\frac{\text{Moles of triamine}}{\text{Moles of glycol}} = \text{at least 0.25 but not in excess of 4.0}$$

The active hydrogen atoms employed in the first ratio above are those found to be "active" by the recognized Zerewitinoff method. Thus, a glycol has two "active hydrogen" groups, and a triamine has three such groups.

The reacting ingredients proportioned in accordance with the above directions are introduced into a reaction vessel which is provided with a heating means and facilities for stirring the reacting mass. The reaction may be carried out in the presence or in the absence of a solvent. When a solvent is employed it may be any suitable high-boiling organic liquid which is a solvent for the reactants. In the event that the solvent so chosen is a non-solvent for the resinous materials produced by the condensation, the method utilizing such non-solvent is not necessarily rendered inoperative. In this event, the resinous materials at a certain stage in the condensation separate out as a second liquid phase and may be separated by suitable phase separation methods. Suitable solvents in which the reaction can be carried out may be any of the following: Chlorinated biphenyls, chlorinated naphthalenes, dimethylformamide, diethylene glycol dimethyl ether, triethylene glycol dimethyl ether, diethyl phthalate, pyridine, triethylamine, N-methyl morpholine.

The present reaction may be carried out at temperatures which range from about 90° C. to about 225° C. According to my observations the reaction between the ingredients starts at about 90° C. and progresses smoothly as the temperature is raised to the higher limit. A basic gas, identified as ammonia, is liberated from the reaction mass commencing at about 90° and becoming more rapid at about 130° C.

The temperature and time of treatment employed for the condensation of the reactants will vary with the specific ingredients employed in the process and will not necessarily be the same for the several alternative materials included herein. The degree of condensation as measured by the melting point or solubility of the resinous product will depend upon the time and temperature of heating, in general these properties increasing with the intensity of heating or the duration of heat treatment. The resinous compositions are generally insoluble in most solvents and in water; however, dimethylformamide is a suitable solvent for these resins, should solutions be desired. One skilled in the art having had the benefit of the present disclosure will be able to successfully practice the process and realize the benefits and advantages thereof.

The present invention is illustrated by the following examples:

Example 1

17.5 grams (0.061 mole) of p,p',p''-triaminotriphenylmethane, 9 g. of urea (0.15 mole) and 20 g. of polyethylene glycol 400 (0.05 mole) were mixed together in a glass flask and heated on a water-bath at 90–95° C. for about one hour, the material in the flask changing to a very thick red mush. On raising the temperature to 130–135° C. the reacting mass bubbled fairly rapidly. Upon cooling to 60° or so the product was still syrupy. On cooling to room temperature the materials were hard solids.

A drop of the condensation product prepared as above, was placed on an aluminum surface and squeezed between another aluminum surface. Upon cooling, the bond between the two aluminum objects was strong enough so that it could not be pulled apart readily.

*Example 2*

In the following series of tests the triamine, urea and glycol were varied so as to give varying values for the ratios explained above. The following experiments were carried out:

| Exp. No. | TTA[1] | | Urea | | PEG[2] | | TTA[3] PEG | Urea[4] Active H |
|---|---|---|---|---|---|---|---|---|
| | g. | moles | g. | moles | g. | moles | | |
| 1 | 10.8 | 0.0375 | 4.4 | 0.0735 | 20 | 0.05 | 0.75 | 0.35 |
| 2 | 10.8 | 0.0375 | 6.3 | 0.105 | 20 | 0.05 | 0.75 | 0.50 |
| 3 | 10.8 | 0.0375 | 8.16 | 0.136 | 20 | 0.05 | 0.75 | 0.65 |
| 4 | 14.5 | 0.050 | 7.5 | 0.125 | 20 | 0.05 | 1.0 | 0.50 |
| 5 | 18.1 | 0.0625 | 8.65 | 0.144 | 20 | 0.05 | 1.25 | 0.50 |

[1] TTA=triaminotriphenylmethane.
[2] PEG=polyethylene glycol, 400 M. W.
[3] Mole ratio.
[4] Ratio of moles of urea to total equivalents of active H groups.

The above ingredients were mixed in 2-ounce bottles and heated for an hour at 110–150° C., at which temperatures the compositions were homogeneous, thin liquids. Upon cooling to room temperature, experiment 5 was hard, while the others were very syrupy and gummy. Upon further heating at 150° C. for several hours, the remainder also became hard.

The resin produced in experiment No. 4 in the above tabulation was employed in cementing various structural materials together. To this end test samples were made up in such fashion that they could be tested in tension and a measure of strength of the bond obtained. The following results were obtained with the resin of experiment No. 4.

| Components of bonded structure: | P. s. i. at failure |
|---|---|
| Steel/resin/steel | 575 |
| Steel/resin/glass | 600 |
| Magnesium/resin/magnesium | 525 |
| Steel/resin/vinyl plastic | 120 |

In a similar manner the resin in experiment No. 5 was employed to join two aluminum sheets. Upon testing, the structure withstood a stress of more than 1250 p. s. i. at failure.

The present resinous products may be employed to adhesively bond various structural elements together, such for example, as wood to wood, glass to glass, fiber board to fiber board, cloth to cloth, paper to paper, regenerated cellulose to regenerated cellulose, cellulose esters to cellulose esters, gellatin to gellatin, mica to mica, steel to steel, steel to glass, steel to aluminum, steel to cellulose acetate, steel to acrylic plastics, steel to vinyl plastics, steel to wood, a sheet of metal foil to a moisture-proof material comprising a cellulosic material and various combinations of these and other bases.

What I claim is:

1. The resinous condensation product obtained by heating to a temperature of at least 90° C., a mixture comprising the following reactants: (1) a compound of the formula:

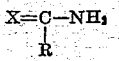

where X is selected from the group consisting of O, S and NH and R is selected from the group consisting of —NH$_2$ and

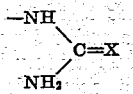

(2) a glycol and (3) a triamine, said triamine containing only NH$_2$ groups and no other active hydrogen containing groups, the relative proportions of said reactants in said mixture being such as to satisfy the ratio:

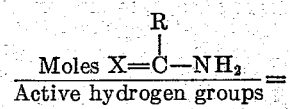

at least 0.25 but not in excess of 1.5 in which ratio the active hydrogen groups are the active hydrogen groups present in said glycol and triamine, the relative proportions of said reactants also satisfying the ratio:

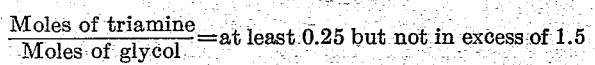

2. The condensation product defined in claim 1, in which the glycol is polyethylene glycol.

3. The condensation product defined in claim 1, in which the compound:

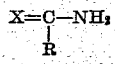

is urea.

4. The condensation product defined in claim 1, in which the triamine is triaminotriphenylmethane.

5. The condensation product defined in claim 1, in which the glycol is a polyethylene glycol having a molecular weight of abou 400.

References Cited in the file of this patent

UNITED STATES PATENTS

| 2,145,242 | Arnold | Jan. 31, 1939 |
| 2,155,328 | Paquin | Apr. 18, 1939 |

FOREIGN PATENTS

| 894,764 | France | June 2, 1942 |

U. S. DEPARTMENT OF COMMERCE
PATENT OFFICE

CERTIFICATE OF CORRECTION

Patent No. 2,824,856     James H. Saunders     February 25, 1958

It is hereby certified that error appears in the printed specification of the above numbered patent requiring correction and that the said Letters Patent should read as corrected below.

Column 4, line 38, for "excess of 1.5" read --excess of 4.0--.

Signed and sealed this 10th day of June 1958.

(SEAL)
Attest:
KARL H. AXLINE
Attesting Officer

ROBERT C. WATSON
Commissioner of Patents